United States Patent
Jung et al.

(10) Patent No.: US 10,430,976 B2
(45) Date of Patent: Oct. 1, 2019

(54) METHOD AND APPARATUS FOR PRODUCING AND REPRODUCING AUGMENTED REALITY CONTENTS IN MOBILE TERMINAL

(71) Applicant: Samsung Electronics Co., Ltd., Suwon-si, Gyeonggi-do (KR)

(72) Inventors: Jin-He Jung, Suwon-si (KR); Kwang-Cheol Choi, Gwacheon-si (KR); Dae-Kyu Shin, Suwon-si (KR); Seung-Pyo Ryu, Suwon-si (KR); Shin-Jun Lee, Yongin-si (KR); Sung-Joo Ahn, Seoul (KR); Ik-Hwan Cho, Suwon-si (KR); Tae-Hwan Son, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/602,021

(22) Filed: May 22, 2017

(65) Prior Publication Data

US 2017/0256075 A1 Sep. 7, 2017

Related U.S. Application Data

(63) Continuation of application No. 13/188,307, filed on Jul. 21, 2011, now Pat. No. 9,659,385.

(30) Foreign Application Priority Data

Jul. 23, 2010 (KR) .................. 10-2010-0071190

(51) Int. Cl.
*G06T 11/00* (2006.01)
*G06K 9/00* (2006.01)
*H04L 29/06* (2006.01)

(52) U.S. Cl.
CPC .......... *G06T 11/00* (2013.01); *G06K 9/00671* (2013.01); *H04L 67/38* (2013.01)

(58) Field of Classification Search
CPC  G06T 1/00; G06T 1/0007; G06T 3/00; G06T 3/0006; G06T 7/004–0048;
(Continued)

(56) References Cited

U.S. PATENT DOCUMENTS 6,151,564 A   11/2000 Vescovi et al.
8,823,697 B2   9/2014 Woo et al.
(Continued)

FOREIGN PATENT DOCUMENTS

KR  20030021120 A  3/2003
KR  20050030711 A  3/2005
(Continued)

OTHER PUBLICATIONS

Notice of Preliminary Rejection dated Jun. 14, 2016 in connection with Korean Application No. 10-2010-0071190, 18 pages.

*Primary Examiner* — Ke Xiao
*Assistant Examiner* — Jed-Justin Imperial

(57) ABSTRACT

A method and an apparatus produce and reproduce Augmented Reality (AR) contents in a mobile terminal. In the method, contents are produced. An image including an object corresponding to the contents is recognized. Recognition information for the object corresponding to the contents is obtained based on a recognition result. AR contents including the contents and the recognition information are generated. Therefore, AR contents for an input image may be easily produced and reproduced, and the AR contents may be used as independent multimedia contents, not an auxiliary means of other contents.

21 Claims, 10 Drawing Sheets

(58) Field of Classification Search
CPC ...... G06T 11/00; G06K 9/00; G06K 9/00624; G06K 9/0063; G06K 9/00664; G06K 9/00671; G06K 9/20; G06K 9/36; G06K 9/62–6298; G06K 9/78–82; H04L 67/38

See application file for complete search history.

(56) References Cited

U.S. PATENT DOCUMENTS

| | | |
|---|---|---|
| 2003/0044068 A1 | 3/2003 | Kagehiro et al. |
| 2005/0011957 A1 | 1/2005 | Attia et al. |
| 2007/0255571 A1 | 11/2007 | Noh et al. |
| 2008/0253656 A1 | 10/2008 | Schwartzberg et al. |
| 2009/0289956 A1 | 11/2009 | Douris et al. |
| 2010/0033484 A1 | 2/2010 | Kim et al. |
| 2010/0309226 A1 | 12/2010 | Quack et al. |

FOREIGN PATENT DOCUMENTS

| | | |
|---|---|---|
| KR | 20060065159 A | 6/2006 |
| KR | 20080052338 A | 6/2008 |
| KR | 20090044702 A | 5/2009 |
| KR | 20090056760 A | 6/2009 |
| KR | 20090061514 A | 6/2009 |
| KR | 20090087332 A | 8/2009 |
| KR | 20100022896 A | 3/2010 |

METHOD AND APPARATUS FOR PRODUCING AND REPRODUCING AUGMENTED REALITY CONTENTS IN MOBILE TERMINAL

CROSS-REFERENCE TO RELATED APPLICATION(S) AND CLAIM OF PRIORITY

The present application is a continuation of U.S. patent application Ser. No. 13/188,307 filed on Jul. 21, 2011 and is related to and claims priority under 35 U.S.C. § 119(a) to a Korean patent application filed in the Korean Intellectual Property Office on Jul. 23, 2010 and assigned Serial No. 10-2010-0071190, the contents of these applications is hereby incorporated by reference.

TECHNICAL FILED OF THE INVENTION

The present invention relates to a method and an apparatus for producing and reproducing Augmented Reality (AR) contents in a mobile terminal. More particularly, the present invention relates to an apparatus and a method for recognizing an input image to produce and reproduce AR contents.

BACKGROUND OF THE INVENTION

AR is a technology for overlaying a virtual image on a real world seen by a user, and is also called Mixed Reality (MR) since it merges a virtual world having additional information with a real world to show the merged world as one image.

Recently, as the function of a mobile terminal is diversified, an AR technology for coupling virtual information to an image input via a camera and providing the coupled image to a user is under development. For example, a function for obtaining position information via a Global Positioning System (GPS) receiver at the mobile terminal, obtaining virtual information corresponding to the position of the mobile terminal, and coupling the obtained virtual information to the input image to provide the coupled image to a user is provided. However, since the AR function provides virtual information corresponding to the position of the mobile terminal, the virtual information may be information not related to an input image of the mobile terminal.

Of course, recently, a technology for transmitting, at a mobile terminal, information of an object included in an input image to a server, and then downloading a result thereof from the server to provide the same to a user is provided. For example, a technology for transmitting information regarding a printed book to a server, and then downloading digital contents regarding the printed book from the server, or a technology for transmitting an appearance, an image, and a price of a product to a server, and then downloading information regarding the product from the server is provided. However, in these technologies, an object and a purpose as a subject are limited to one object and one purpose, so that it is difficult to apply these technologies to another object.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for producing and reproducing Augmented Reality (AR) contents in a mobile terminal.

Another aspect of the present invention is to provide a method and an apparatus for producing AR contents including recognition information of a subject object in a mobile terminal.

Still another aspect of the present invention is to provide a method and an apparatus for recognizing an object and reproducing corresponding AR contents in a mobile terminal.

In accordance with an aspect of the present invention, a method for reproducing Augmented Reality (AR) contents in a mobile terminal is provided. The method includes, when an AR contents reproduction event occurs, receiving an image. The method also includes determining whether a web address exists on the image via an Optical Character Reader (OCR). The method further includes, when the web address exists on the image, downloading AR contents from the web address. The method still further includes reproducing the downloaded contents.

In accordance with another aspect of the present invention, an apparatus for reproducing Augmented Reality (AR) contents in a mobile terminal is provided. The apparatus includes an input unit configured to receive an image when an AR contents reproduction event occurs. The apparatus also includes an image recognizer configured to determine whether a web address exists on the image via an Optical Character Reader (OCR). The apparatus further includes an obtain unit configured to download AR contents from the web address when the web address exists on the image. The apparatus still further includes a reproduction unit configured to reproduce the downloaded contents.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

FIGS. 1 to 8B discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Exemplary embodiments of the present invention provide a technology for producing AR contents including recognition information of a subject object and recognizing the subject object to reproduce the AR contents in a mobile terminal.

Figure 1:
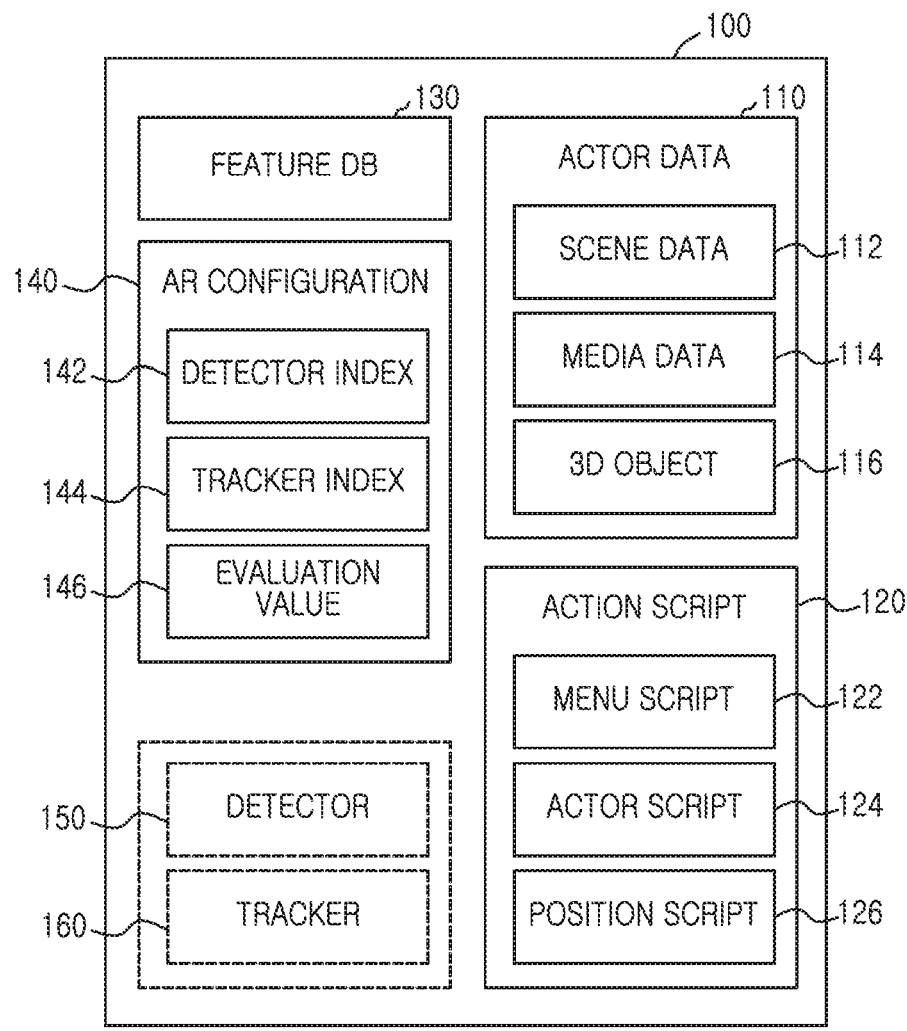
FIG. 1 illustrates the construction of AR contents according to an embodiment of the present invention.

FIG. 1 is a view illustrating the construction of AR contents according to an embodiment of the present invention.

Referring to FIG. 1, the AR contents 100 include actor data 110, an action script 120, a feature database (DB) 130, and AR configuration 140. The AR contents 100 may or may not additionally include a detector 150 and a tracker 160 depending on a producer's selection.

The actor data 110 serves as a resource forming a screen to interact with a user, and includes scene data 112 forming an entire scene, three-dimensional (3D) object data 116, which is information regarding 3D objects (for example, vertex, texture, and animation), and multimedia data 114. The actor data 110 may designate a Uniform Resource Identifier (URI) of a web.

The action script 120 serves as a script defining an operation for a user input that occurs when the user input occurs at a point at which relevant AR contents are reproduced. The action script 120 includes a menu script for providing items forming a menu and an operation guide when the menu is selected according to the user input, an actor script defining a relevant operation when a user operation for an object displayed on a screen occurs, and a position script defining an event at a specific position.

The feature DB 130 represents a feature value of an image object to be recognized on an input image in order to reproduce the AR contents.

The AR configuration 140 serves as recognition information used for reproducing the AR contents. The AR configuration 140 includes a detector index 142 and a tracker index 144 representing information for a detector and a tracker used for recognizing an object for the AR contents, and an evaluation value 146 for the detector and the tracker. That is, the evaluation value 146 denotes respective thresholds that a detection result value of the detector and a tracking result value of the tracker should meet in order to reproduce the AR contents.

The detector 150 and the tracker 160 are suitable for recognizing an object corresponding to the AR contents, and may be or may not be included in the AR contents depending on selection of a producer. That is, the producer may produce AR contents including the detector 150 and the tracker 160 in preparation for when a mobile terminal that will reproduce the AR contents does not include the detector and the tracker. For example, when the AR contents are contents regarding an object A, and a detector A and a tracker B are used in recognizing the object A, the producer may incorporate the detector A and the tracker B into the AR contents when producing the AR contents regarding the object A.

According to an embodiment of the present invention, the above configured AR contents may be reproduced via a separate exclusive AR player, or may be reproduced via a generally provided camera application.

Figure 2A:
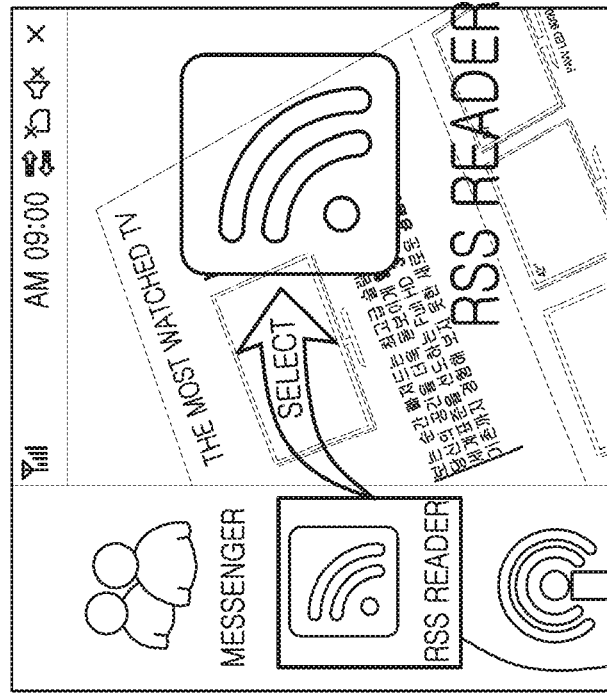
FIGS. 2A and 2B illustrate a screen construction for reproducing AR contents in a mobile terminal according to an embodiment of the present invention.
Figure 2B:
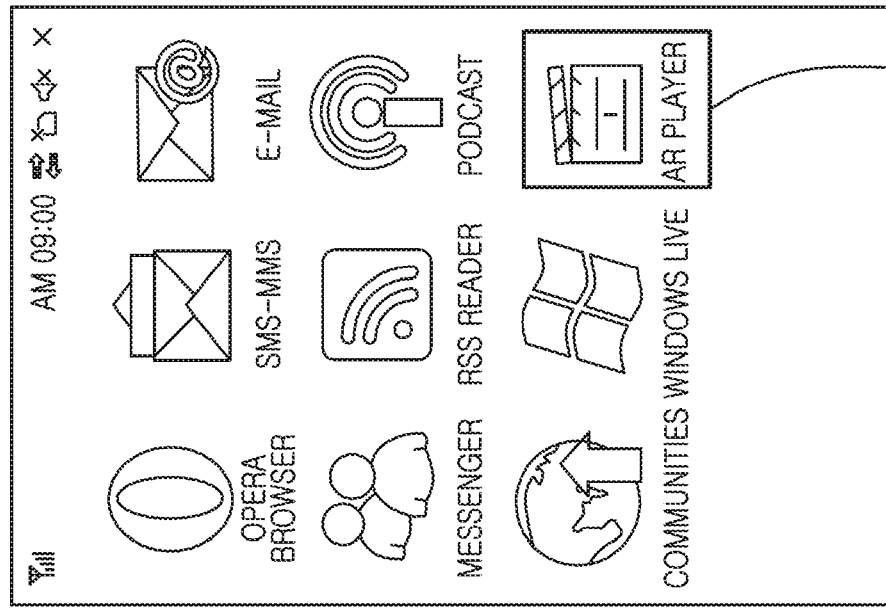

FIGS. 2A and 2B are views illustrating a screen construction for reproducing AR contents in a mobile terminal according to an embodiment of the present invention. An embodiment of the present invention, as illustrated in FIG. 2A, may recognize a subject object on an image input from a camera to reproduce AR contents corresponding to a recognition result by configuring a separate AR contents player 201 and driving the AR contents player 201 according to a user's manipulation.

In addition, an embodiment of the present invention, as illustrated in FIG. 2B, may recognize whether the user performs an operation for reproducing the AR contents to reproduce the AR contents by displaying an icon 203 representing the AR contents on a predetermined region of a screen during a preview via a generally provided camera application, or providing a menu accessible to the AR contents. Here, the operation for reproducing the AR contents may be an operation of dragging the icon 203 representing the AR contents to a preview screen region, or an operation of selecting the AR contents via a menu accessible to the AR contents.

In addition, when a web address for AR contents is included in an input image, the mobile terminal according to an embodiment of the present invention may reproduce the AR contents corresponding to the input image by recognizing the web address and downloading the AR contents from the web address.

Figure 3A:
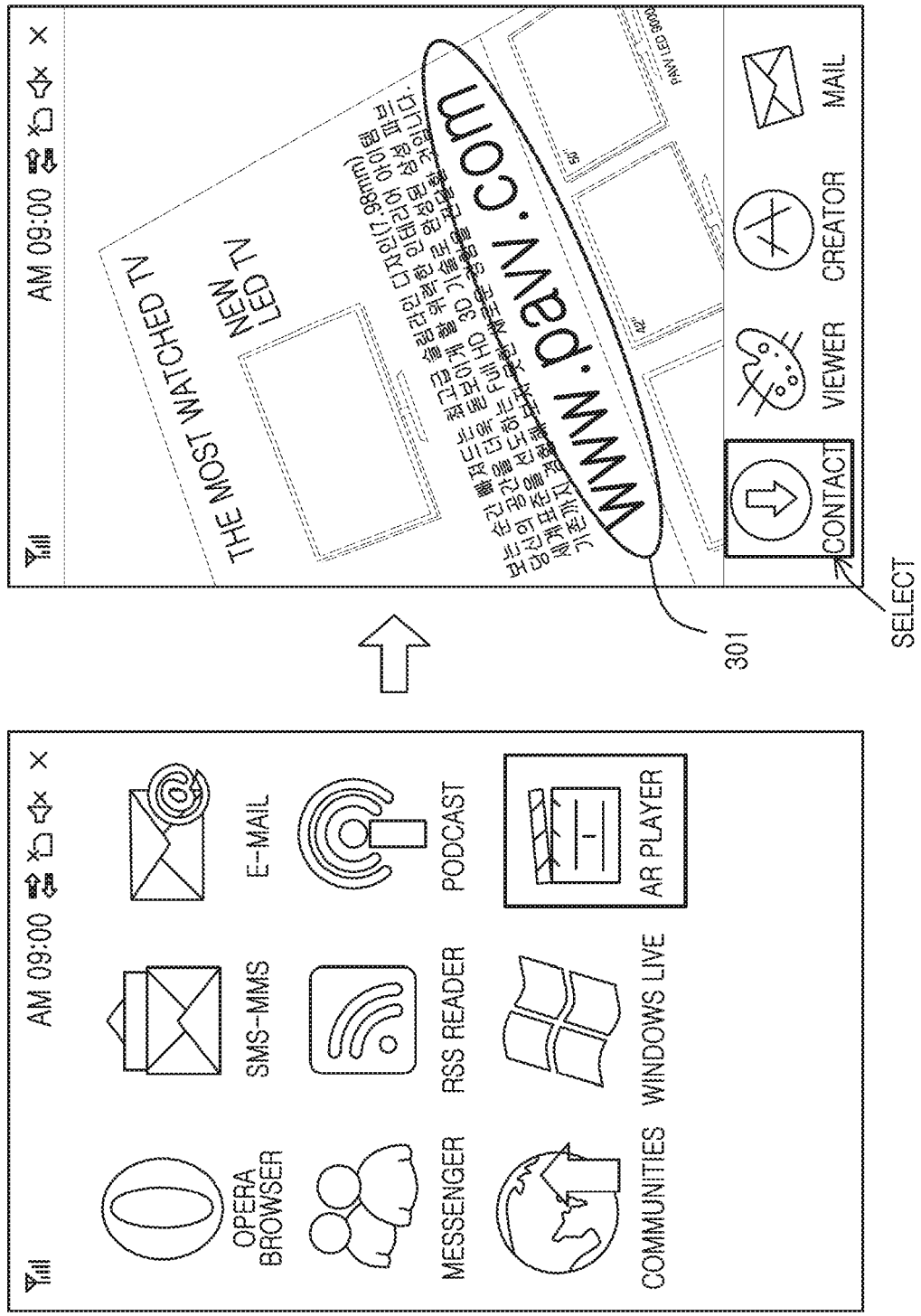
FIGS. 3A and 3B illustrate a screen construction for obtaining and reproducing AR contents using a web address in a mobile terminal according to an embodiment of the present invention.
Figure 3B:
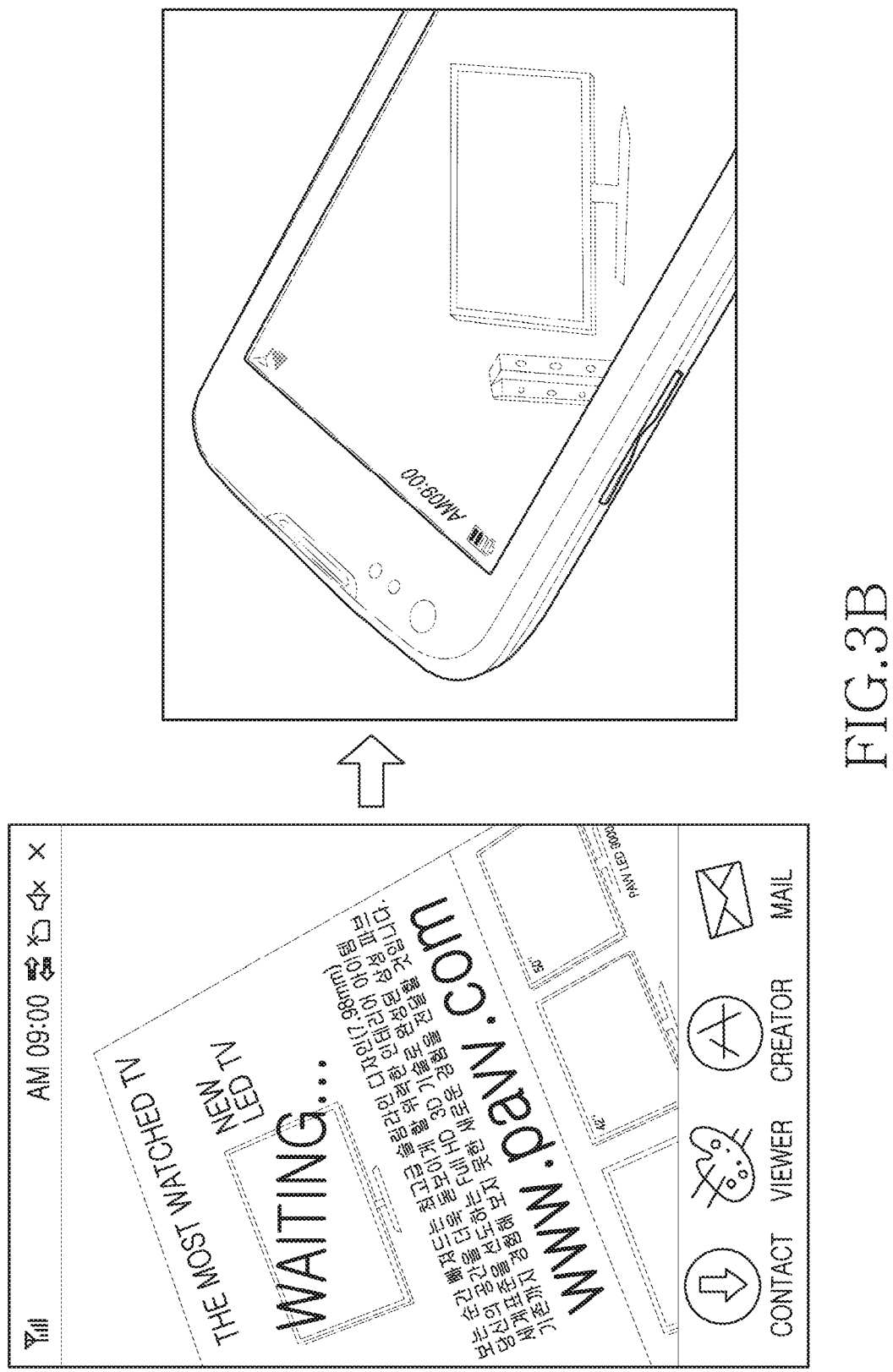

FIGS. 3A and 3B illustrate a screen construction for obtaining and reproducing AR contents using a web address in a mobile terminal according to an embodiment of the present invention. As illustrated in FIGS. 3A and 3B, when an exclusive AR player is selected for reproducing AR contents in the mobile terminal, the mobile terminal drives a camera to determine whether a web address exists in an input image. When the web address exists, the mobile terminal accesses the relevant web address to download AR contents to reproduce the downloaded contents. Here, the mobile terminal may recognize that 'www.pavv.com' 301, which is a web address, exists in the input image, and access the recognized web address 'www.pavv.com' 301 to download and reproduce TV advertisement contents. At this point, the mobile terminal may determine whether the web address exists in the input image using an Optical Character Reader (OCR). Of course, though the downloading of the AR contents using the web address has been described here for convenience in description, it would be obvious to those skilled in the art that AR contents may be downloaded via Really Simple Syndication (RSS), an Electronic (E)-mail, or a web-link.

In addition, when a plurality of subject objects exist in an input image, the mobile terminal according to an embodiment of the present invention may reproduce AR contents for each object.

Figure 4:
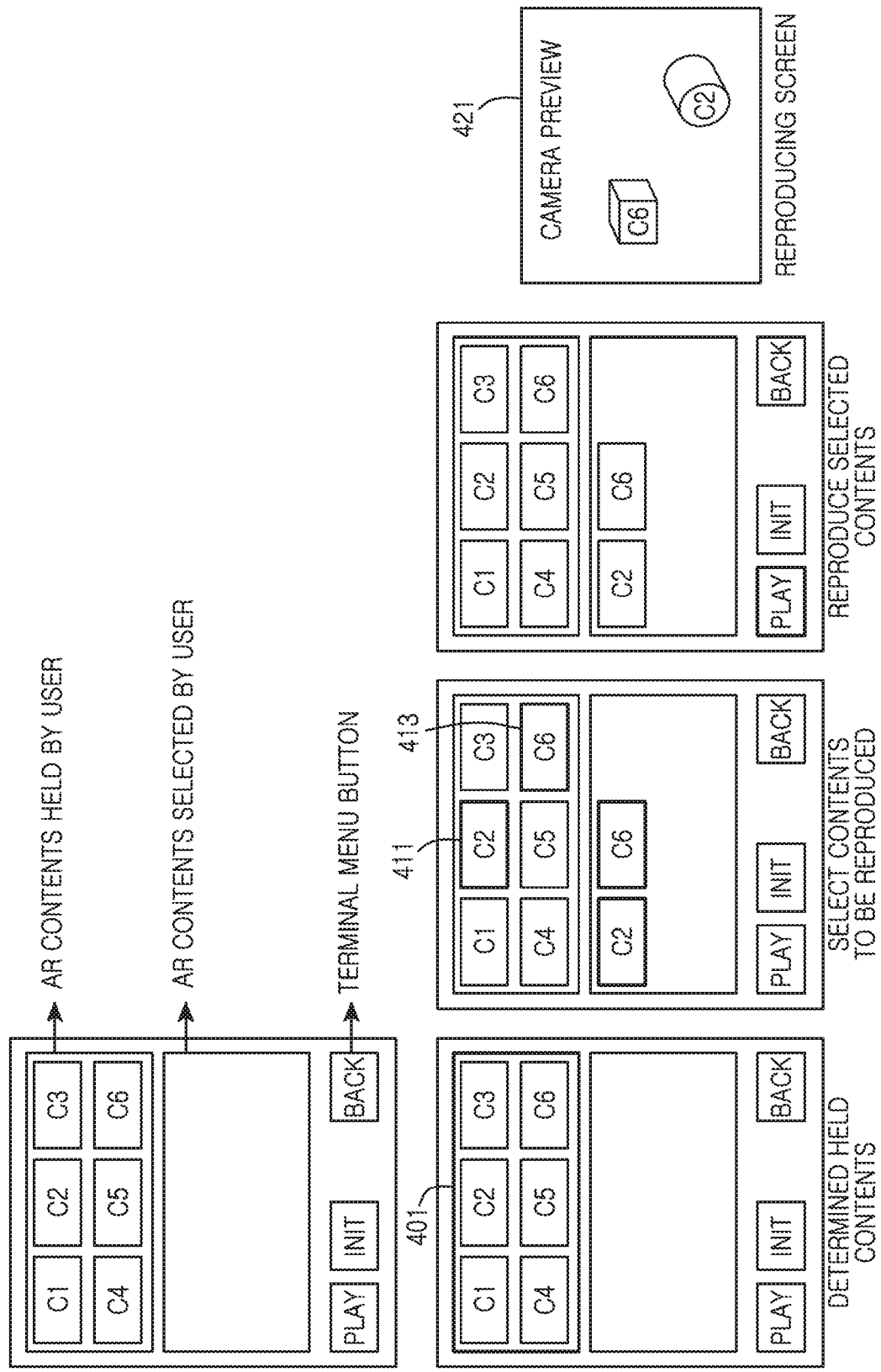
FIG. 4 illustrates a screen construction for reproducing a plurality of AR contents in a mobile terminal according to an embodiment of the present invention.

FIG. 4 is a view illustrating a screen construction for reproducing a plurality of AR contents in a mobile terminal according to an embodiment of the present invention.

As illustrated in FIG. 4, when a plurality of subject objects are included in an input image, a user selects AR contents corresponding to the plurality of subject objects from AR contents stored in advance in the mobile terminal, so that the mobile terminal may recognize the plurality of subject objects, and then reproduce a plurality of AR contents meeting the recognition result. For example, when a plurality of subject objects are included in an input image, a user determines that AR contents C1 to C6 are stored in the mobile terminal, and selects AR contents C2 411 and C6 413 corresponding to the plurality of subject objects from the stored AR contents C1 to C6 401, so that the mobile terminal may recognize the plurality of subject objects. Then when the recognition result is met, the mobile terminal may simultaneously reproduce the selected plurality of AR contents C2 411 and C6 413 during a camera preview 421. Here, when the position of a subject object included in the input image changes depending on movement of the mobile terminal or movement of the subject object, a reproduction position of the AR contents may be changed. In addition, when a subject object included in the input image changes depending on movement of the mobile terminal or movement of the subject object, the mobile terminal may recognize the changed subject object and then reproduce AR contents meeting the recognition result.

Figure 5:
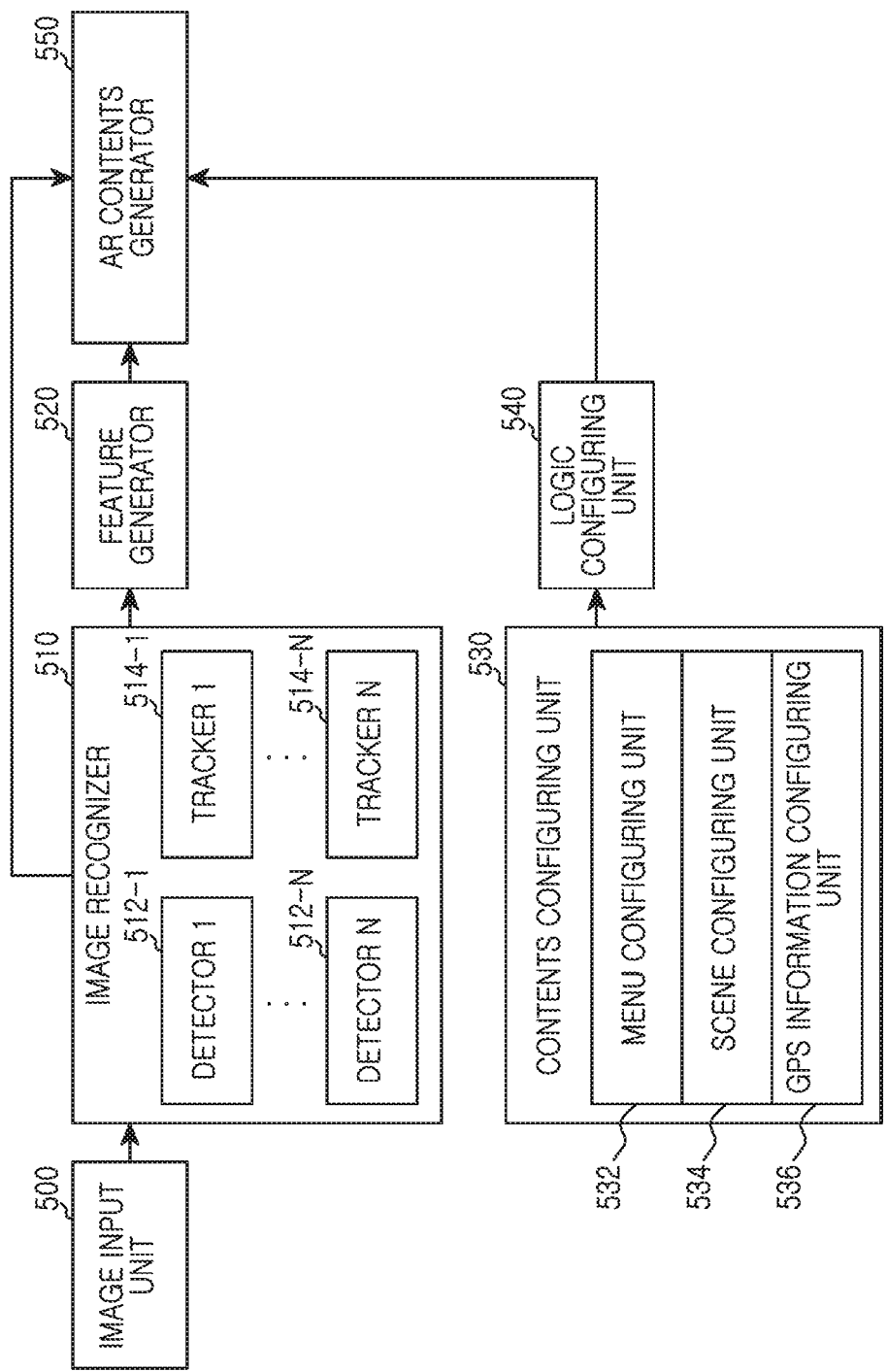
FIG. 5 is a block diagram for producing AR contents in a mobile terminal according to an embodiment of the present invention.

FIG. 5 is a block diagram for producing AR contents in a mobile terminal according to an embodiment of the present invention.

Referring to FIG. 5, the mobile terminal includes an image input unit 500, an image recognizer 510, a feature generator 520, a contents configuring unit 530, a logic configuring unit 540, and an AR contents generator 550.

The image input unit 500 receives an image via a camera (not shown) to provide the same to the image recognizer 510. The input image may be a marker for a subject object, an image including a marker, or an image including the subject object. Here, the marker includes a web address, RSS, an E-mail, and a web-link for the subject object.

The image recognizer 510 includes a plurality of detectors 512-1 to 512-N, and a plurality of trackers 514-1 to 514-N to recognize an input image using the respective detectors and trackers, and select one detector and one tracker having an optimized recognition result. The image recognizer 510 provides the recognition result of the input image obtained using the selected detector and tracker to the feature generator 520. Here, the detectors 512-1 to 512-N detect an object from the input image, and the trackers 514-1 to 514-N track movement of the detected object. The detectors 512-1 to 512-N and the trackers 514-1 to 514-N may be classified depending on the kind of each object. For example, the detectors 512-1 to 512-N may be classified into a face detector, a character detector, and a detector for detecting various objects besides a face and a character. The detectors 512-1 to 512-N and the trackers 514-1 to 514-N may be differently configured depending on a company or a designer.

In addition, the image recognizer 510 may allow a contents producer to select a detector and a tracker to be used for recognizing the input image from the plurality of detectors 512-1 to 512-N and the plurality of trackers 514-1 to 514-N, recognize the input image using the selected detector and tracker, and provide the recognition result to the feature generator 520.

In addition, the image recognizer 510 provides information regarding the selected detector and tracker, that is, a detector index, a tracker index, evaluation values for the detector and the tracker to the AR contents generator 550. Here, the evaluation value for the detector and the tracker may be set by repeatedly recognizing one input image corresponding to AR contents to be produced and then averaging the recognition result, or may be set by averaging recognition results for a plurality of input images corresponding to the AR contents, or may be set directly by the producer.

The feature generator 520 generates a feature point for the AR contents from the recognition result provided from the image recognizer 510, and then provides the feature point to the AR contents generator 550. Here, the feature point denotes a feature for the subject object of the contents.

The contents configuring unit 530 generates or receives actor data and action script forming AR contents under control of a producer to provide the same to the logic configuring unit 540. More particularly, the contents configuring unit 530 includes a menu configuring unit 532 to configure a menu of the AR contents according to the producer's intention. That is, the contents configuring unit 530 generates a menu provided while the AR contents are reproduced, a function corresponding to each item forming the menu, and events under control of the producer. In addition, the contents configuring unit 530 includes a scene configuring unit 534 to arrange screen configuring elements (for example, a photo, a moving image, a text, and a 3D object) displayed on a screen while the AR contents are reproduced, and sounds in a specific space and a specific time under control of the producer. That is, the scene configuring unit 534 may define an event for a user's input while the AR contents are reproduced. For example, when the AR contents are images advertising a TV, the scene configuring unit 534 may define to generate a specific sound or additionally display detailed information regarding the TV when a user who appreciates the AR contents touches the TV. In addition, the contents configuring unit 530 includes a GPS information configuring unit 536 to define an event for a specific position.

The logic configuring unit 540 connects actor data and action scripts output from the contents configuring unit 530, determines whether a logical error exists, and when the logical error does not exist, provides the connected actor data and action scripts to the AR contents generator 550. When the logical error exists in the actor data and action scripts, the logic configuring unit 540 informs the producer of the error to induce the producer to reconfigure actor data and action script corresponding to the portion where the logical error has occurred.

The AR contents generator 550 generates the AR contents illustrated in FIG. 1 using input information. Here, the generated AR contents may be transmitted to a different terminal or a web server via a communication module (not shown). At this point, the AR contents may be transmitted to the different terminal via an E-mail or a multimedia message service. Here, when the AR contents are registered in a web server, a producer may obtain an effect of easily distributing the AR contents by informing users of a relevant web address. At this point, RSS, an E-mail, or a web-link may be used instead of the web address.

Figure 6:
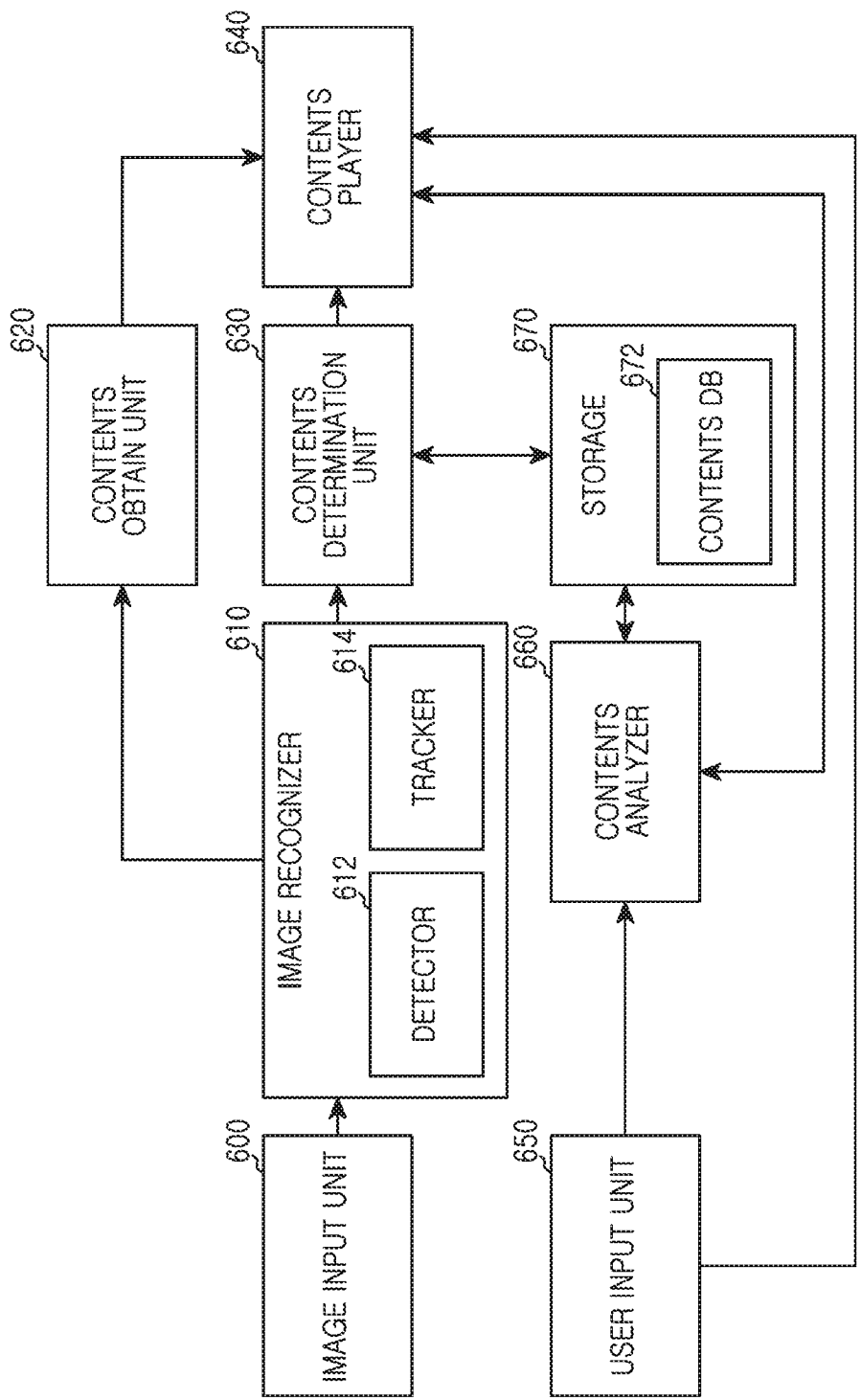
FIG. 6 is a block diagram for reproducing AR contents in a mobile terminal according to an embodiment of the present invention.

FIG. 6 is a block diagram for reproducing AR contents in a mobile terminal according to an embodiment of the present invention.

Referring to FIG. 6, the mobile terminal includes an image input unit 600, an image recognizer 610, a contents obtain unit 620, a contents determination unit 630, a contents player 640, a user input unit 650, a contents analyzer 660, and a storage 670.

The image input unit 600 receives an image via a camera (not shown) to provide the same to the image recognizer 610. The input image may be a marker for a subject object and may be an image including the subject object.

The image recognizer 610 includes at least one detector 612 and at least one tracker 614. The image recognizer 610 recognizes the input image via an OCR to determine whether a web address exists in the input image. This is for determining whether to download AR contents corresponding to the input image from a web server or whether to search for the AR contents corresponding to the input image from AR contents stored in advance. When the web address exists, the image recognizer 610 provides the recognized web address to the contents obtain unit 620.

When the web address does not exist, the image recognizer 610 receives information that is used for recognizing the input image from the contents analyzer 660 to recognize the input image. That is, the image recognizer 610 receives a detector index and a tracker index corresponding to specific AR contents and evaluation values from the contents analyzer 660, and detects and tracks the input image using a detector and a tracker corresponding to the indexes among detectors and trackers stored in advance in the mobile terminal. After that, the image recognizer 610 determines whether result values obtained by performing the detection and the tracking meet the relevant evaluation values, respectively, to determine the input image is successfully recognized. When the result values meet the relevant evaluation values, respectively, and so the input image is successfully recognized, the image recognizer 610 provides the feature point of the input image obtained by the detector and the tracker and relevant AR contents information to the contents determination unit 630. Here, when not storing in advance the detector and the tracker corresponding to the detector index and the tracker index, the image recognizer 610 may receive a detector and a tracker included in relevant AR contents from the contents analyzer 660.

When a detector index and a tracker index corresponding to a plurality of AR contents, respectively, and evaluation values are provided from the contents analyzer 660, the image recognizer 610 may detect and track the input image using a detector and a tracker corresponding to the plurality of contents, respectively, to determine whether an input image is successfully recognized. For example, when information representing 'detector 1, tracker 1, and evaluation values a and b' is input with respect to AR contents A, and information representing 'detector 2, tracker 2, and evaluation values c and d' is input with respect to AR contents B from the contents analyzer 660, the image recognizer 610 detects and tracks an input image using the detector 1 and the tracker 1, and then determines whether the detection result and the tracking result meet the evaluation values a and b, and detects and tracks the input image using the detector 2 and the tracker 2, and then determine whether the detection result and the tracking result meet the evaluation values c and d to determine whether recognition is successful.

In addition, the image recognizer 610 constantly tracks the position of a subject object from the input image to provide the position to the contents player 640 via the contents determination unit 630. In addition, when the subject object changes in the input image, the image recognizer 610 informs the contents determination unit 630 of the change and performs a function for recognizing the changed subject object.

The contents obtain unit 620 accesses a relevant web server via a web address provided from the image recognizer 610 to download AR contents in real-time, and then provides the downloaded AR contents to the contents player 640. Of course, when AR contents for the web address are obtained in advance and stored in the storage 670, the contents obtain unit 620 may omit the contents download operation.

When the recognition of the image recognizer 610 is successful, the contents determination unit 630 receives information regarding a feature point of an input image and relevant AR contents, and searches for a feature point of the AR contents from the storage 670 to determine whether the feature point of the AR contents coincides with the feature point of the input image. At this point, when the two feature points coincide, the contents determination unit 630 determines the AR contents as reproduction contents.

In addition, when a plurality of AR contents information corresponding to a plurality of feature points is provided from the image recognizer 610, the contents determination unit 630 determines whether each feature point coincides with a feature point of relevant AR contents. At this point, when the each feature point coincides with a feature point of the relevant AR contents, the contents determination unit 630 may determine the plurality of AR contents as AR contents corresponding to the input image.

The contents determination unit 630 provides information regarding the determined AR contents to the contents player 640 or directly searches for the determined AR contents from a contents DB 672 of the storage 670 to provide the same to the contents player 640.

The contents player 640 reproduces AR contents provided from the contents obtain unit 620 or the contents determination unit 630. At this point, the contents player 640 may receive analysis information regarding actor data and action script from the contents analyzer 660 to configure a menu and a screen using the analysis information, and perform a function according to a user's input. The contents player 640 may set and change a reproduction position of the AR contents depending on the position of the subject object in an input image provided as a result of the recognition of the image recognizer 610. In addition, when a user input is provided from the user input unit 650 during reproduction of the AR contents, the contents player 640 controls and processes a function for performing an event corresponding to the user input. For example, while a user performs an operation for selecting a menu during reproduction of the AR contents, the contents player 640 may display an item of a menu provided by the AR contents. In addition, when the user touches a specific object displayed on a screen during reproduction of the AR contents, the contents player 640 may display information regarding a relevant object or generate vibration mapped in advance, and give an effect of visually changing an image of the touched object (for example: size change of an image, color change, position change, an animation effect, and so forth).

Here, the contents player 640 may include a logic flow engine, an actor manager, a platform commander, and a 3D engine. At this point, the logic flow engine receives whether a subject object exists in an input image, a position, and a user input to determine an event for interacting, and transfers a relevant event to the platform commander or the actor manager. At this point, when the determined event is a function subordinate to a platform or related to a multimedia, the logic flow engine may inform the platform commander managing the platform that the event is determined. When the determined event is related to an animation or screen configuration, the logic flow engine may inform the actor manager managing the event that the event is determined. The 3D engine performs a function for generating an animation and reconfiguring the screen depending on management of the actor manager.

The user input unit 650 includes at least one function key or touch sensor. The user input unit 650 may allow a user to select at least one AR content corresponding to the input image.

When information of selecting at least one AR content is provided from the user input unit 650, the contents analyzer 660 searches for the relevant AR contents from the storage 670 to analyze a relevant detector index and a relevant tracker index, and an evaluation value, and analyzes actor data and action script. The contents analyzer 660 provides an analysis result regarding the AR contents determined in the contents determination unit 630 to the contents player 640.

According to an embodiment of the present invention, the storage 640 includes the contents DB 672 for storing at least one AR contents.

Here, though the image recognizer 610 determines whether a web address exists in an input image and then performs a relevant function, when a user is allowed to input whether a web address exists in the input image depending on the design of the mobile terminal, and non-existence of the web address in the input image is input by the user, a process of determining whether the web address exists at the image recognizer 610 may be omitted.

Figure 7:
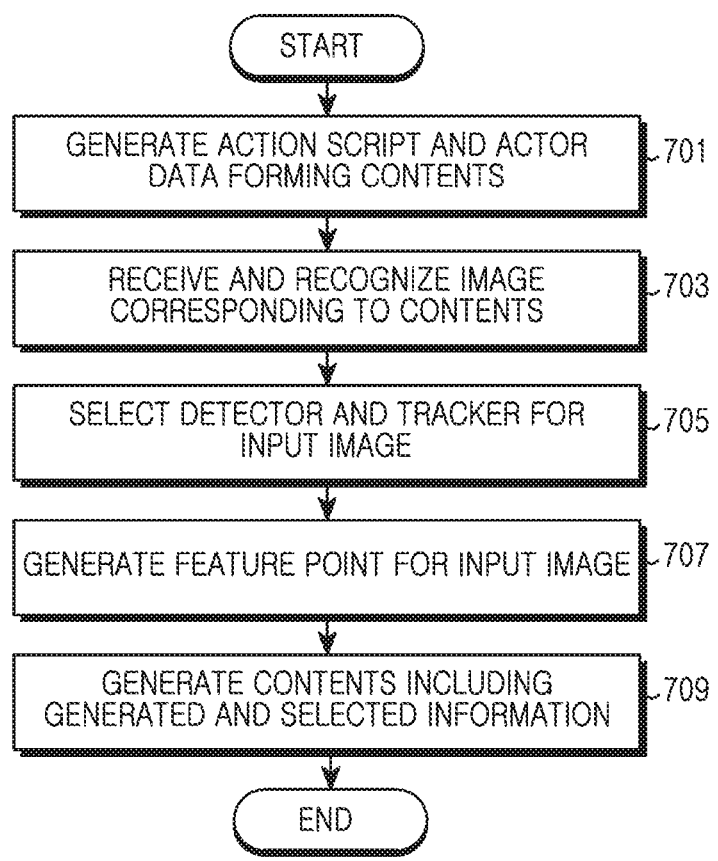
FIG. 7 is a flowchart illustrating a procedure for producing AR contents in a mobile terminal according to an embodiment of the present invention.

FIG. 7 is a flowchart illustrating a procedure for producing AR contents in a mobile terminal according to an embodiment of the present invention.

Referring to FIG. 7, the mobile terminal generates an action script and actor data configuring AR contents under control of a producer in step 701. The mobile terminal then proceeds to step 703 to receive an image corresponding to the AR contents, and then recognizes the input image. At this point, the mobile terminal detects and tracks the input image using a plurality of detectors and trackers stored in advance.

The mobile terminal selects a detector and a tracker for an input image based on the recognition result in step 705. That is, the mobile terminal compares results of recognizing the input image using the plurality of detectors and trackers to select a detector and a tracker having an optimized recognition result.

The mobile terminal generates a feature point of the AR contents based on the results of recognizing the input image in step 707, and then generates AR contents illustrated in FIG. 1 using the generated and selected information. Here, the generated AR contents may be transmitted to a different terminal or a web server.

Figure 8A:
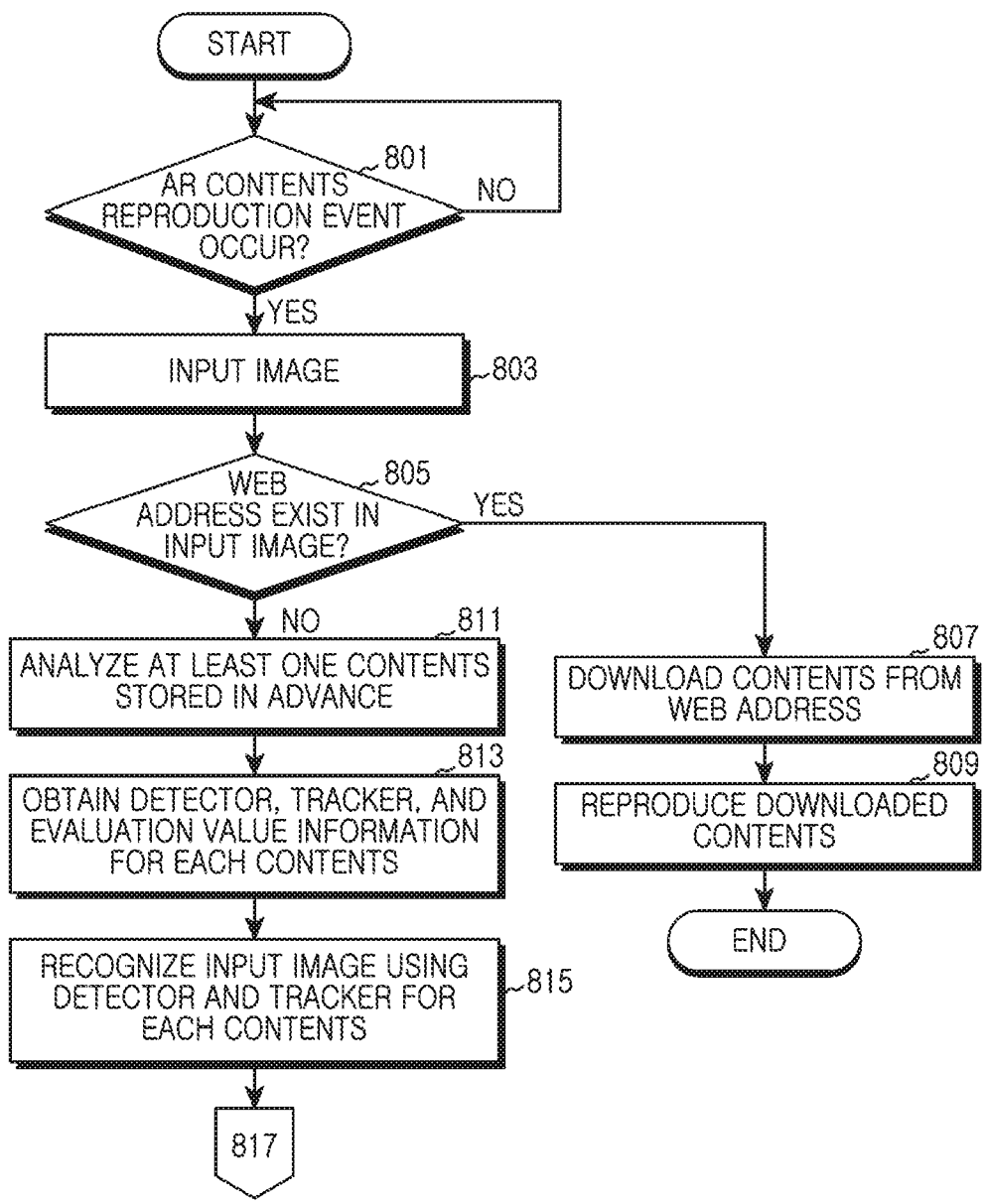
FIGS. 8A and 8B are flowcharts illustrating a procedure for reproducing AR contents in a mobile terminal according to an embodiment of the present invention.
Figure 8B:
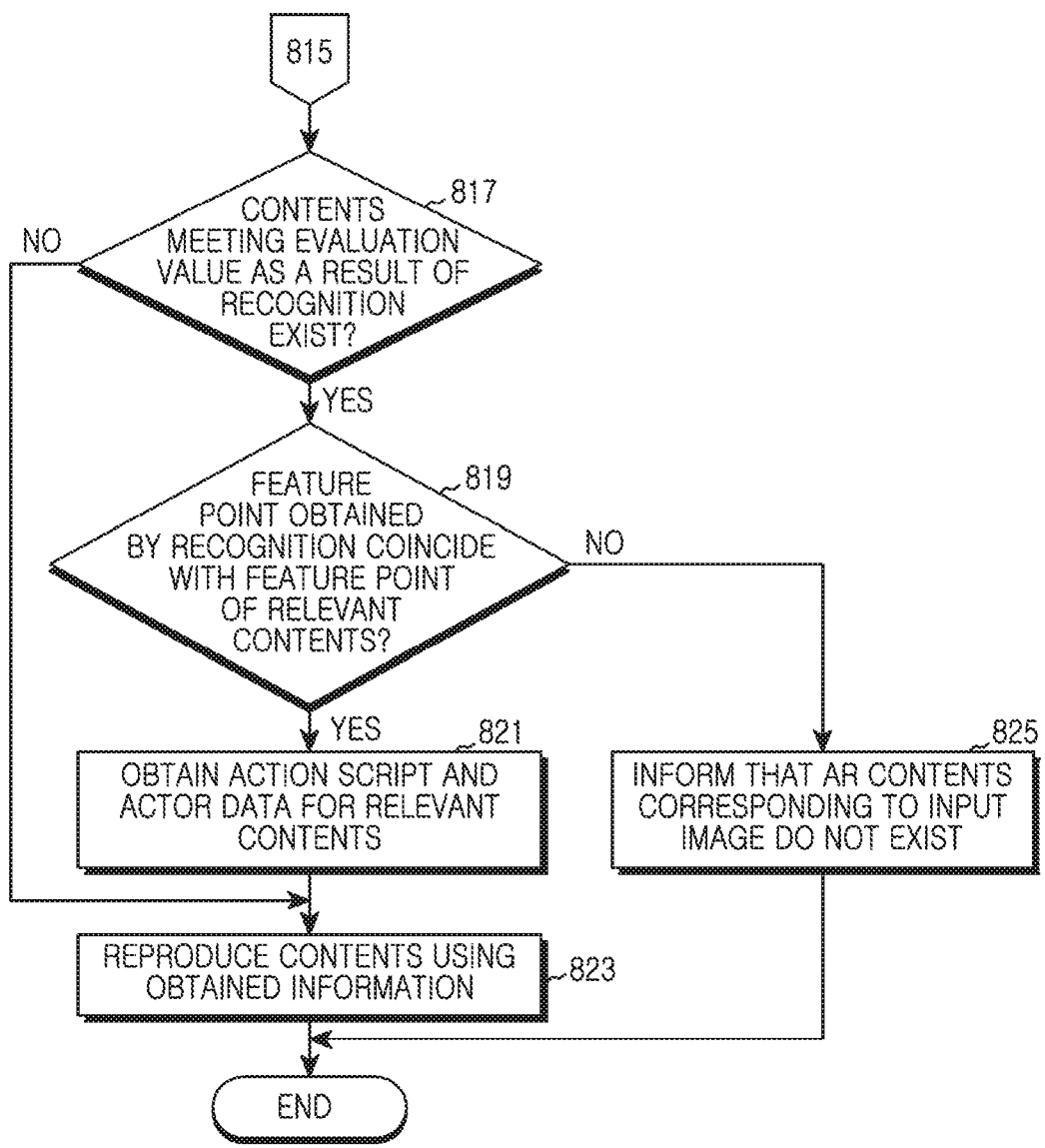

FIGS. 8A and 8B are flowcharts illustrating a procedure for reproducing AR contents in a mobile terminal according to an embodiment of the present invention.

Referring to FIGS. 8A and 8B, the mobile terminal determines whether an AR contents reproduction event occurs in step 801. When the AR contents reproduction event occurs, the mobile terminal receives an image via a camera in step 803.

The mobile terminal determines whether a web address exists in an input image in step 805. At this point, the mobile terminal may determine whether the web address exists in the input image using an OCR, or may allow a user to input information representing whether the web address exists in the input image.

When the web address exists in the input image, the mobile terminal downloads AR contents from the web address in step 807, and reproduces the downloaded AR contents in step 809. After that, the mobile terminal ends the algorithm according to an embodiment of the present invention.

Alternatively, returning to step 805, when the web address does not exist in the input image, the mobile terminal proceeds to step 811 to analyze at least one content stored in advance, and proceeds to step 813 to obtain detector, tracker, and evaluation value information for each content. At this point, when a predetermined number of contents are selected by the user, the mobile terminal may analyze only the selected predetermined number of contents to obtain detector, tracker, and evaluation value information for each of the selected contents.

The mobile terminal recognizes an input image using a detector and a tracker for the each content in step 815. That is, the mobile terminal selects a detector and a tracker corresponding to the obtained detector and tracker information from supportable detectors and trackers to detect and track the input image. Here, when the mobile terminal does not support the detector and the tracker corresponding to the obtained detector and tracker information, the mobile terminal may obtain the detector and the tracker from the relevant AR contents.

The mobile terminal determines whether contents meeting a relevant evaluation value exist as a result of the recognition in step 817. That is, the mobile terminal detects and tracks the input image using the detector and the tracker corresponding to each content, and then determines whether the result value is greater than or equal to the evaluation value. When the contents meeting the relevant evaluation value do not exist as a result of the recognition, the mobile terminal proceeds to step 825 to inform the user that the AR contents corresponding to the input image do not exist and ends the algorithm according to an embodiment of the present invention.

Alternatively, when the contents meeting the relevant evaluation value exist as a result of the recognition, the mobile terminal determines whether a feature point of an input image obtained via a detector and a tracker for relevant AR contents coincides with a feature point of the relevant AR contents. When the AR contents having the coinciding feature point do not exist, the mobile terminal informs the user that the AR contents corresponding to the input image do not exist in step 825, and ends the algorithm according to an embodiment of the present invention.

When the AR contents having the coinciding feature point exist, the mobile terminal obtains an action script and actor data for the relevant AR content in step 821, and proceeds to step 823 to reproduce the relevant AR contents using the obtained information. Here, when the position and the size of an object corresponding to AR contents that are being reproduced change in the input image, the mobile terminal may change the reproduction position and size of the AR contents.

After that, the mobile terminal ends the algorithm according to an embodiment of the present invention.

Though the AR contents include a detector index and a tracker index to represent information regarding a detector and a tracker to be used for recognizing a subject object in the above description, the AR contents may include different information that may identify a detector and a tracker. For example, the AR contents may include a detector identifier and a tracker identifier.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof. According to an embodiment of the present invention, a mobile terminal produces AR contents including recognition information of a subject object, and recognizes the subject object to reproduce the AR contents, so that AR contents for an input image may be easily produced and reproduced, and the AR contents may be used as independent multimedia contents, not an auxiliary means of other contents. In addition, recognition information of a subject object is included in the AR contents, so that a time and a procedure consumed for recognizing the subject object in an input image are reduced. Also, a tracker and a recognizer that may recognize the subject object are added to the AR contents when appropriate, so that even a mobile terminal that does not support a recognition function for a subject object may reproduce the AR contents.

What is claimed is:

1. An electronic device comprising:
an input interface configured to receive an image;
a memory configured to store at least one augmented reality (AR) content, wherein each of the at least one AR content includes at least one feature point and recognition information for reproducing the at least one AR content; and
a processor configured to:
recognize the image including an object based on the recognition information, wherein the recognition information comprises an index of a detector or an index of a tracked,
determine a feature point of the object based on the recognized image; determine an AR contents with a feature point corresponding to the feature point of the object among the at least one AR contents, and reproduce the determined AR contents,
wherein the processor is configured to recognize the image, by using a detector corresponding to the index of the detector and a tracker corresponding to the index of the tracker among at least one detector and at least one tracker stored in the electronic device.

2. The electronic device of claim 1, wherein the processor is configured to recognize the image by:
obtaining the recognition information from the at least one AR contents, the recognition information comprises an evaluation value of the detector, or an evaluation value of the tracker;
detecting the object in the image using the detector corresponding to the index of the detector;
tracking the detected object using the tracker corresponding to the index of the tracker;
comparing a detecting result value of the object with the evaluation value of the detector; and
comparing a tracking result value of the object with the evaluation value of the tracker.

3. The electronic device of claim 2, wherein the determined AR contents further comprises the detector or the tracker, and wherein if the detector corresponding to the index of the detector or the tracker corresponding to the index of the tracker does not exist in the electronic device, the processor is configured to obtain the detector or the tracker from the determined AR contents.

4. The electronic device of claim 1, wherein the processor is configured to determine the AR contents by comparing the feature point obtained by recognizing the image with the feature point from the AR contents.

5. The electronic device of claim 1; wherein the processor is configured to:
detect at least one of a change of a size of the object or a change of a position of the object corresponding to the determined AR contents; and
change at least one of position or size of the determined AR contents depending on the detected change.

6. The electronic device of claim 1, wherein the processor is configured to perform an event according to at least one script included in the reproduced AR contents in response to detecting an input on the reproduced AR contents, and
wherein the event comprises at least one of a menu item display, information display depending on an object touch, vibration generation, sound generation, or a visual change of an object image.

7. The electronic device of claim 1,
wherein the detector and tracker were used to recognize another image including the object before the object in the received image is recognized.

8. An electronic device comprising:
an input interface configured to receive an image; and
a processor configured to:
recognize the image for detecting an object included in the image;
obtain:
recognition information for reproducing augmented reality (AR) contents and
a feature point of the detected object based on the detected object, wherein the recognition information comprises an index of a detector or an index of a tracker; and
generate the AR contents including the recognition information and the feature point of the detected object,
wherein the processor is configured to obtain the recognition information by using a plurality of recognition results of the received image by a plurality of detectors and a plurality of trackers stored in the electronic device,
wherein the index of the detector corresponds to an optimized recognition result among the plurality of detectors and the index of the tracker corresponds to an optimized recognition result among the plurality of trackers.

9. The electronic device of claim 8, wherein the recognition information of the object further comprises an evaluation value of a selected one of the plurality of detectors, or an evaluation value of the tracker.

10. The electronic device of claim 8,
wherein the detector and tracker were used to recognize another image including the object before the object in the received image is recognized.

11. A method in an electronic device, the method comprising:
storing at least one augmented reality (AR) content, wherein each of the at least one AR content includes at least one feature point and recognition information for reproducing the AR content;
receiving an image;

recognizing the image including an object based on the recognition information, wherein the recognition information comprises an index of a detector or an index of a tracker;
determining a feature point of the object based on the recognized image;
determining an AR contents with a feature point corresponding to the feature point of the object among the at least one AR contents; and
reproducing the determined AR contents,
wherein the recognizing comprises recognizing the image by using a detector corresponding to the index of the detector and a tracker corresponding to the index of the tracker among at least one detector and at least one tracker stored in the electronic device.

12. The method of claim 11, wherein recognizing the image comprises:
obtaining the recognition information from the at least one AR contents, the recognition information comprises an evaluation value of the detector, or an evaluation value of the tracker;
detecting the object in the image using the detector corresponding to the index of the detector;
tracking the detected object using the tracker corresponding to the index of the tracker;
comparing a detecting result value of the object with the evaluation value of the detector; and
comparing a tracking result value of the object with the evaluation value of the tracker.

13. The method of claim 12, wherein the determined AR contents further comprises the detector or the tracker, and
wherein if the detector corresponding to the index of the detector or the tracker corresponding to the index of the tracker does not exist in the electronic device, obtaining the detector or the tracker from the determined AR contents.

14. The method of claim 11, wherein the determining the AR contents comprises comparing the feature point obtained by recognizing the image with the feature point from the AR contents.

15. The method of claim 11, the method further comprising:
detecting at least one of a change of a size of the object or a change of a position of the object corresponding to the determined AR contents; and
changing at least one of position or size of the determined AR contents depending on the detected change.

16. The method of claim 11, the method further comprising performing an event according to at least one script included in the reproduced AR contents in response to detecting an input on the reproduced AR contents, and
wherein the event comprises at least one of a menu item display, information display depending on an object touch, vibration generation, sound generation, or a visual change of an object image.

17. The method of claim 11, the method further comprising:
recognizing another image for detecting another object included in the another image;
obtaining recognition information and a feature point of the another object based on the another object; and
generating augmented reality (AR) contents including the recognition information and the feature point of the another object.

18. The method of claim 17, the method further comprising recognizing the another image using a plurality of detectors and a plurality of trackers stored in the electronic device.

19. The method of claim 18, wherein obtaining the recognition information comprises:
selecting a detector and a tracker among the plurality of detectors and the plurality of trackers based on a recognition result of the image; and
obtaining information on the selected detector and the tracker as the recognition information.

20. The method of claim 19, wherein the recognition information of the object comprises an index of the selected detector, an index of the selected tracker, an evaluation value of the selected detector, or an evaluation value of the selected tracker.

21. The method of claim 11,
wherein the detector and tracker were used to recognize another image including the object before the object in the received image is recognized.

* * * * *